United States Patent [19]
Langley

[11] 4,130,035
[45] Dec. 19, 1978

[54] SPRING MOUNTED SUPPORT FOR BARSTOCK

[76] Inventor: Allie B. Langley, 11810 Chimney Rock, #54, Houston, Tex. 77035

[21] Appl. No.: 845,519

[22] Filed: Oct. 26, 1977

[51] Int. Cl.$^2$ .................. B23B 13/08; B23B 25/00
[52] U.S. Cl. ..................... 82/38 A; 10/162 R
[58] Field of Search .......... 82/38 A, 38 R, 39; 10/162 R

[56] References Cited

U.S. PATENT DOCUMENTS

| | | | |
|---|---|---|---|
| 4,000,797 | 1/1977 | Ducanis | 82/38 A |
| 4,030,585 | 6/1977 | Ducanis | 82/38 A |

FOREIGN PATENT DOCUMENTS 1483772  5/1967  France ........................ 82/38 R Primary Examiner—Leonidas Vlachos
Attorney, Agent, or Firm—Eugene N. Riddle

[57] ABSTRACT

Barstock being fed into an automatic machine, such as a lathe, for forming workpieces from the barstock is supported on a rotatable indexing head. Each elongate bar of barstock is received within an inner tube which is supported on an indexing head. The bar is supported within the associated tube in a radially spaced relation to the inner circumference of the tube by a plurality of spring mounted supports spaced about the outer circumference of the bar for resiliently supporting the bar as it is fed into the machine thereby to minimize noise.

3 Claims, 5 Drawing Figures

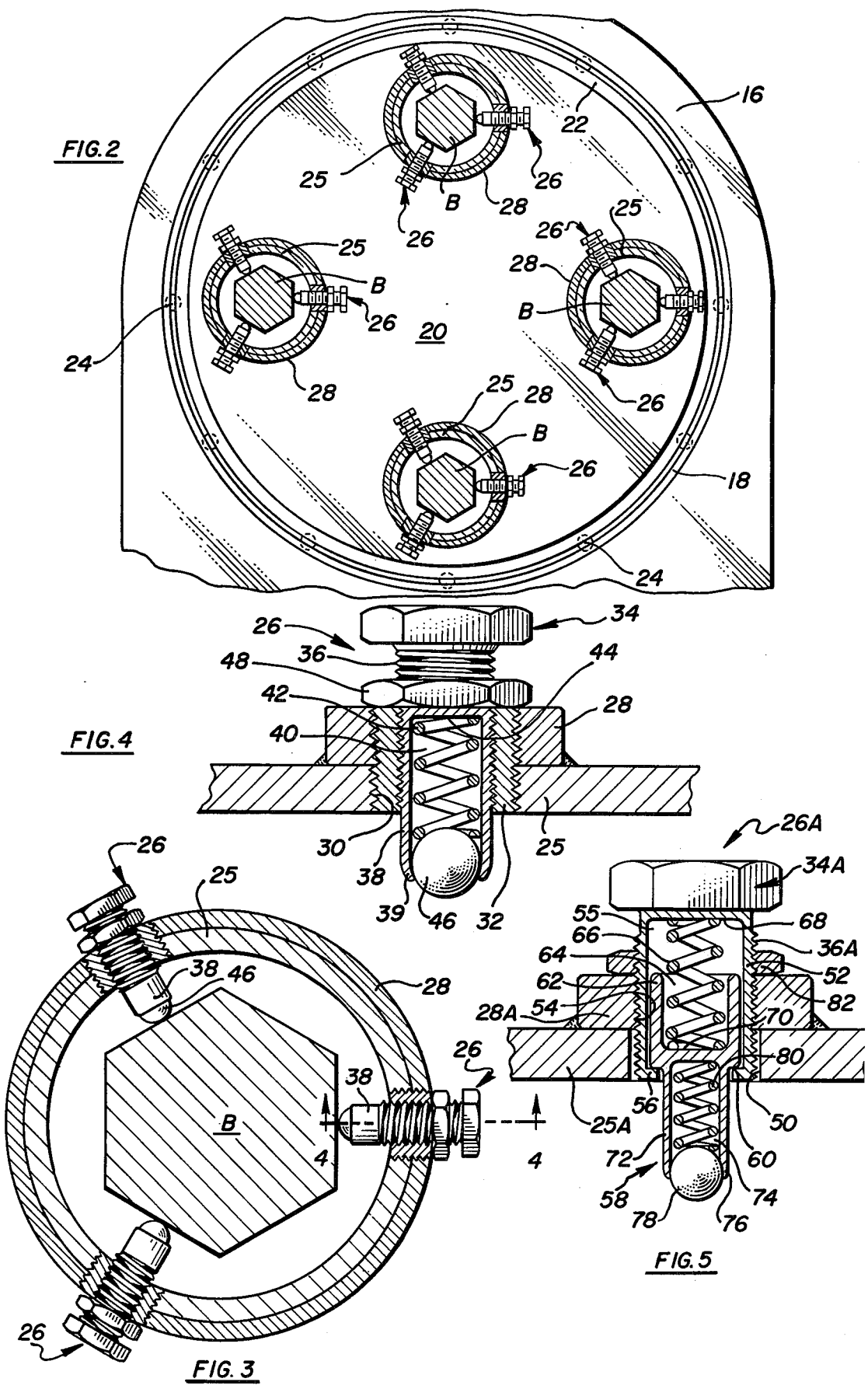

SPRING MOUNTED SUPPORT FOR BARSTOCK

BACKGROUND OF THE INVENTION

Heretofore, the feeding of stock into an automatic machine, such as a lathe or screw machine, is an extremely noisy operation, particularly where the stock is being fed into the machine at a rapid rate of speed and the rotatable indexing head creates a great amount of clatter so that a shop equipped with such machines is extremely noisy. Several attempts heretofore have been made to reduce the noise associated with such operations such as providing insulating material about the mechanism in which the bars are mounted, or by mounting resilient plastic sleeves about the barstock so that the barstock will feed along the resilient sleeves with a minimum of noise. Barstock sometimes has a rough outer surface such as spurs and this tends to wear the plastic sleeves and the like through abrasion which necessitates the replacement of such sleeves quite often.

Sound insulating material employed heretofore may consist of packing such as mineral wool, cotton, felt or the like packed within a shell through which the barstock is fed. These arrangements have been satisfactory in the reduction of noise but are costly in application.

DESCRIPTION OF THE PRESENT INVENTION

The present invention is directed to supporting means for the barstock being fed into an automatic machine for forming workpieces with the separate bars being held by a rotatable indexing mechanism. The bars are each individually mounted in a relatively small diameter tube and resilient supports for the bars are mounted on each tube and spaced about the circumference of the bar. As the bar or barstock is fed longitudinally into the machine any lateral movement of the barstock which might result from irregularities on the outer surface of the barstock, for example, is compensated by the resilient supports which permits the barstock to float within the receiving tubes. The resilient support for the barstock includes a ball in contact with the associated bar and spring urged outwardly so that the ball may be moved to a retracted position by irregularities in the barstock. The projection of the resilient support for the barstock may be adjusted so that different diameter barstock may be utilized.

The barstock is spaced from the inner circumference of the tube and is in contact only with the resiliently mounted ball supports. Therefore, noise or sound resulting from the feeding of the bars into the automatic machine is minimized. Further, since the balls are formed of a hardened material the life of the support means is relatively long. The balls are mounted for adjustment toward and away from the barstock.

Reference is now made to the accompanying drawings in which:

FIG. 2 is a section taken generally along the line 2—2 of FIG. 1 showing the supports for the barstock being fed through the machine;

FIG. 3 is an enlarged fragment of FIG. 2 illustrating one of the supports with three resiliently mounted ball supports spaced about the circumference of a bar to support the bar for longitudinal movement into the machine;

FIG. 4 is an enlarged section taken generally along line 4—4 of FIG. 3; and

FIG. 5 is an enlarged section of another embodiment of this invention showing a separate resilient mounting for the barstock having a resiliently mounted carrier for the ball.

Figure 1:
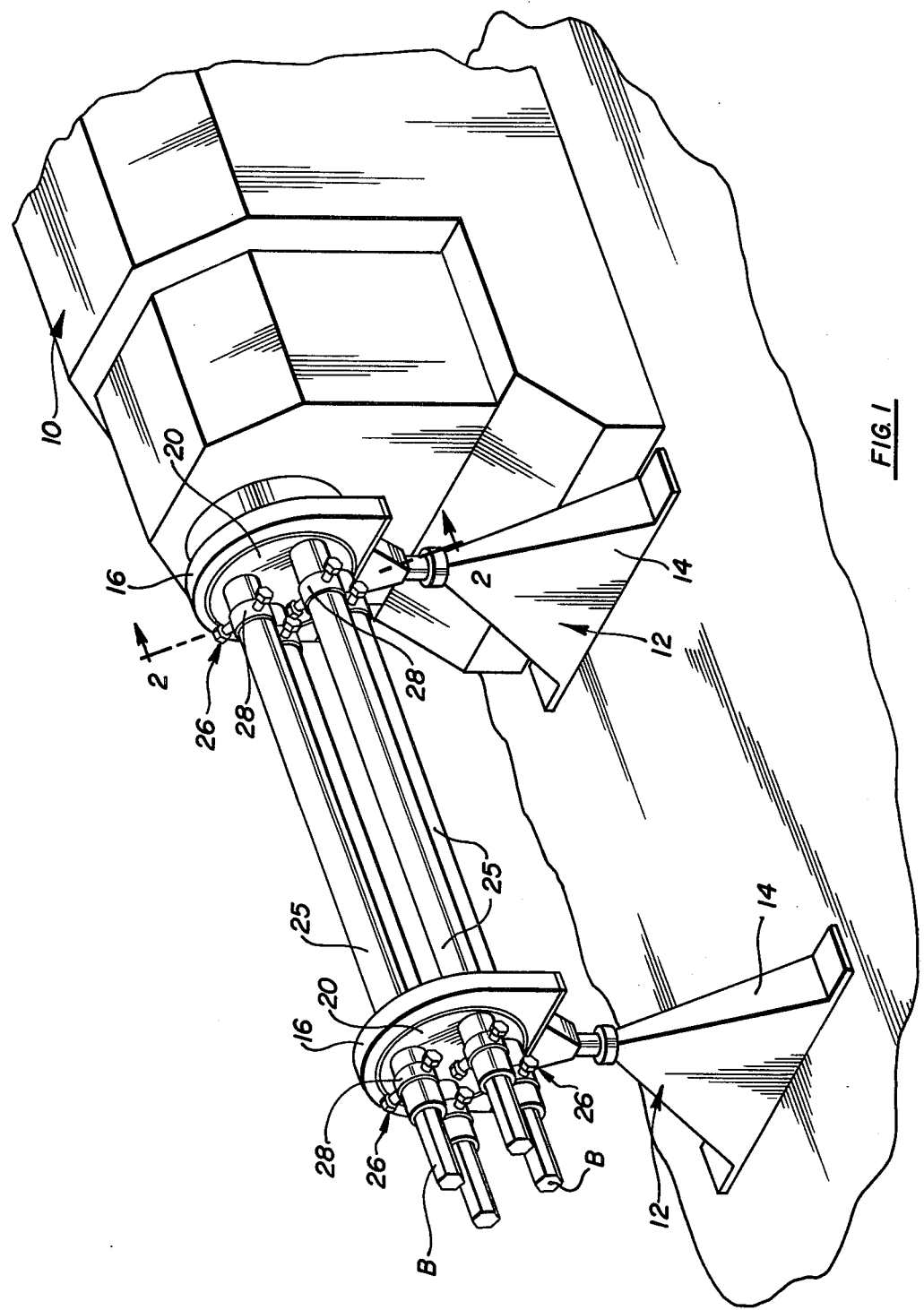
FIG. 1 is a perspective view illustrating an automatic machine in which the present invention may be utilized with the barstock being fed into the machine for forming workpieces.

Referring now to the drawings for a better understanding of the invention and particularly to the embodiment shown in FIGS. 1-4, an automatic lathe is illustrated generally at 10 and barstock comprising a plurality of bars B being fed into the automatic lathe for forming the bars into workpieces. To support the bars B as they are being fed longitudinally into machine 10, a pair of fixed vertical supports generally indicated at 12 are shown. Support 12 includes a base 14 which is secured to the floor and an upper support collar 16 is mounted on the upper end of base 14. An outer race 18 is mounted within collar 16 and a plate 20 which is received within collar 16 has an inner race 22 thereon. Ball bearings 24 are mounted between inner race 22 and outer race 18 so that plate 20 may rotate relative to collar 16. A rotatable indexing mechanism as is well known in the art is provided for automatic machine 10 to rotate the barstock from one work station to another work station as desired. Plates 20 rotate with the index mechanism.

Mounted in a fixed relation within openings in plates 20 are a plurality of tubes 25. Each tube 25 receives a bar B which is illustrated as being of a hexagonal cross section and is mounted in spaced relation to the inner circumference of the associated tube 25. Mounted at selected intervals along the length of each tube 25 are reinforcing bands 28 secured to the outer surface of each tube 25. As illustrated in the drawings, three supports 26 for each bar B are arranged about the circumference of tube 25 at each band 28. It may be desirable to provide additional bar supports 26 for certain shapes of barstock. Tube 25 and band 28 are provided with an internally threaded opening 30 and a sleeve 32 threaded both externally and internally is threaded within associated opening 30. Sleeve 32 is secured within threaded openings 30 after being threaded therein by peening at the outer end portion thereof. A nut generally indicated at 34 is externally threaded at 36 and is threaded within fixed sleeve 32. Nut 34 has a spring housing 38 defining a central bore 40. A spring 42 is mounted within central bore 40 and is biased between bottom 44 of bore 40 and outer ball 46. Housing 38 is inturned at 39 to retain ball 46 therein. Ball 46 is urged outwardly continuously by spring 42 into engagement with bar B and has a hardened outer surface so that it has a strong wear resistance. The position of housing 38 may be adjusted by a lock nut 48 which is threaded about the external screw threads 36 of nut 34. It may be desirable to adjust the position of housing 38 for different types of barstock that might be employed in tube 25. While only one support 26 has been described in detail, it is to be understood that all supports 26 are identical.

Referring to FIG. 5, a separate embodiment of the invention is illustrated in which a barstock support 26A is illustrated mounted within tube 25A and band 28A. Barstock support 26A has a nut generally indicated at 34A which is externally threaded at 36A. Tube 25A has an unthreaded opening 50 which is of a larger diameter than the outer diameter formed by screw threads 36A on the external surface of spring housing 52. Band 28A has an internally threaded opening 54 which receives nut 34A in threaded relation therein.

Housing 52 has an inner retaining flange 56 at the end of a central bore 55 formed by housing 52. A spring carrier generally indicated at 58 is mounted within bore 55 and has an annular abutment 60 thereon adapted to engage in abutting relation retaining flange 56 of housing 52. Spring carrier 58 has an outer spring housing 62 defining an outer end bore 64. A spring 66 is biased between bottom 68 of bore 55 and bottom 70 of bore 64 to urge carrier 58 continuously outwardly. An inner spring housing 72 forms an inner end bore 74. Housing 72 has an inturned inner end 76 which retains a ball 78 therein. A spring 80 is mounted in bore 74 to urge continuously ball 78 outwardly. Spring 66 is stronger than spring 80 and in the event a bar B contacts housing 72 after ball 78 has been moved inwardly, carrier 58 will then move to a retracted position to provide additional resilience and to prevent bottoming out of ball 78. Nut 34A may be adjusted vertically and a lock nut 82 may be provided to secure nut 34A in a selected position.

From the above, an arrangement has been illustrated in which the plurality of bars B being fed into an automatic machine have been supported entirely by resilient support means which minimizes the noise resulting from feeding of the barstock to the machine. The supports include balls which have hardened surfaces in contact with the barstock and have a long life.

What is claimed is:

1. In combination with a machine having tools operating upon a plurality of bars being fed longitudinally within the machine for forming workpieces; a plurality of tubes extending generally horizontally from the machine each receiving a bar therein, bar supporting means spaced along the length of each tube to support the bar therein in spaced relation to inner surface of the associated tube, said bar supporting means including at least three bar supports carried by the associated tube and spaced about the circumference of the bar, each bar support comprising an outer housing fixed to the associated tube, an elongated spring carrier fitting within the housing and extending through an opening in the associated tube, said spring carrier having an inner bore extending within the tube, a spring mounted in said inner bore, a ball carried by the inner end of the spring carrier projecting beyond the spring carrier to contact an adjacent bar and resiliently urged by the spring into contact with the bar, and means resiliently mounting the spring carrier for movement relative to the outer housing toward and away from the bar.

2. The combination as set forth in claim 1 wherein said outer housing is an adjusting nut externally threaded within the opening in the associated tube and has an inner bore therein, said spring carrier being mounted within the inner bore of said adjusting nut.

3. The combination as set forth in claim 2 wherein said spring carrier has an outer end bore and a spring is mounted within the outer end bore and bottomed against the adjusting nut for continuously urging the spring carrier inwardly.

* * * * *